(12) United States Patent
Maher (10) Patent No.: US 8,775,220 B2
(45) Date of Patent: Jul. 8, 2014

(54) METHOD AND SYSTEM FOR ESTIMATING ECONOMIC LOSSES FROM WIND STORMS

(71) Applicant: Sean Maher, Morrisville, NC (US)

(72) Inventor: Sean Maher, Morrisville, NC (US)

(73) Assignee: Core Programs, Morristown, NJ (US)

( * ) Notice: Subject to any disclaimer, the term of this patent is extended or adjusted under 35 U.S.C. 154(b) by 0 days.

(21) Appl. No.: 13/659,335

(22) Filed: Oct. 24, 2012

(65) Prior Publication Data

US 2013/0110558 A1 May 2, 2013

Related U.S. Application Data

(60) Provisional application No. 61/551,498, filed on Oct. 26, 2011.

(51) Int. Cl.
*G06Q 10/00* (2012.01)

(52) U.S. Cl.
USPC .............................................. 705/4; 705/1.1

(58) Field of Classification Search
USPC .............................................. 703/5; 705/1.1
See application file for complete search history.

(56) References Cited

PUBLICATIONS

State of Florida hurricane loss projection model: Atmospheric science component Mark Powella,_, George Soukupa, Steve Cockeb, Sneh Gulatic, Nirva Morisseau-Leroyd, Shahid Hamidc, Neal Dorsta, Lizabeth Axeb Oct. 2003.*

Development of Gridded Fields of Urban Canopy Parameters for Advanced Urban Meteorological and Air Quality Models Steven J. Burian, Jason Ching Aug. 2009.*
Comparison between 2.5-D and 3-D realistic models for wind field adjustment L. Ferragut, R. Montenegro, G. Montero, E. Rodr'iguez, M.I. Asensio, J.M. Escobar Apr. 19, 2010.*
Development of Typhoon Simulation Model for Insurance Risk Estimation *Takeshi Okazaki, Hiroyuki Watabe, Takeshi Ishihara Sep. 2005.*
The sensitivity of a 3D street canyon CFD model to uncertain input parameters. Benson, Dixon, Ziehn and Tomlin 2007.*
T. Gal, et al., "Mapping the Roughness Parameters in a Large Urban Area for Urban Climate Applications"; ACTA Climatologica et Chorologica, Universitatis Szegediensis, Tomus, 40-41, 2007, 27-36.
Kimberly J. Mueller, et al., "The Utility of Surface Roughness Datasets in the Modeling of United States Hurricane Property Losses", RMS Roughness Length Paper, AMS Forum: Environmental Risk and Impact on Society, Jan. 30, 2006, 5 pages.
Peter J. Vickery, et al., "HAZUS-MH Hurricane Model Methodology. II: Damage and Loss Estimation"; Natural Hazards Review; May 2006, pp. 94-103.
Peter J. Vickery, et al., "HAZUS-MH Hurricane Model Methodology. I: Hurricane Hazard, Terrain, and Wind Loading Modeling", Natural Hazards Review, May 2006, pp. 82-93.
Unofficial, Updated Release of ZEUS-MP (v1.5); [online]; Jun. 16, 2012; [retrieved on Jan. 21, 2014; URL: http://www.netpurgatory.com/zeusmp.html]; pp. 1-3.

(Continued)

*Primary Examiner* — William Rankins
(74) *Attorney, Agent, or Firm* — Sughrue Mion, PLLC (57) ABSTRACT

The present invention relates to systems and methods for estimating economic losses from wind storms. Accordingly, provided herein are methods estimating roughness length of an area surrounding a structure, methods calculating local wind speed at a structure, methods of estimating wind pressure on a structure, and methods of calculating the insurability of a structure. Also provided are systems and computer-readable storage media configured for performing the disclosed methods.

12 Claims, 7 Drawing Sheets

(56) References Cited

PUBLICATIONS

ANSYS Fluent Flow Modeling Simulation Software; [online]; [retrieved on Jan. 21, 2014; URL: http://www.ansys.com/Products/Simulation+Technology/Fluid+Dynamics/Fluid+Dynamic . . . ]; pp. 1-2.

OpenFOAM®—The Open Source Computer Fluid Dynamics (CFD) Toolbox; [online]; [retrieved on Oct. 23, 2013; URL: http://www.openfoam.com]; 1 page.

OpenFlower/Free Science & Engineering software downloads at SourceForge.net; [online]; Apr. 9, 2013; [retrieved on Oct. 23, 2013; URL: http://sourceforge.net/projects/openflower]; pp. 1-2.

Flash Center for Computational Science; [online]; [retrieved on Oct. 23, 2013; URL: http://flash.uchicago.edu/site/]; pp. 1-2.

Cosmological simulations with GADGET-2; [online]; [retrieved on Oct. 23, 2013; URL: http://www.mpa-garching.mpg.de/~volker/gadget/right.html]; pp. 1-7.

The Hydra Consortium; [online]; Sep. 7, 2001; [retrieved on Oct. 23, 2013; URL: http://hydra.mcmaster.ca/hydra/title.html]; 1 page.

Fluid Dynamics Solutions; [online]; [retrieved on Nov. 8, 2013; URL: http://www.ansys.com/Products/Simulation+Technology/Fluid+Dynamics]; 1 page.

ANSYS ICEM CFD Mesh Generation Software; [online]; [retrieved on Nov. 8, 2013; URL: http://www.ansys.com/Products/Other+Products/ANSYS+ICEM+CFD]; 1 page.

Multiphysics Simulation Software—Platform for Physics-Based Modeling; [online]; [retrieved on Nov. 8, 2013; URL: http://www.comsol.com/comsol-multiphysics]; p. 1-9.

CFD Research Corporation; [online]; [retrieved on Nov. 8, 2013; URL: http://www.cfdrc.com]; 1 page.

CFD and CAE Software and Support / CD-adapco; [online]; Nov. 7, 2013; [retrieved on Nov. 8, 2013; URL: http://www.cd-adapco.com]; 1 page.

Highly-Accurate CFD Software/Flow-3D developed by Flow Science [online]; 2000-2013; [retrieved on Nov. 8, 2013; URL: http://www.flow3d.com]; 1 page.

\* cited by examiner

METHOD AND SYSTEM FOR ESTIMATING ECONOMIC LOSSES FROM WIND STORMS

CROSS REFERENCE TO RELATED APPLICATION(S)

This application claims the benefit of priority under 35 U.S.C. §119(e) of U.S. Ser. No. 61/551,498, filed Oct. 26, 2011, the entire content of which is incorporated herein by reference.

BACKGROUND OF THE INVENTION

1. Field of the Invention

The present invention relates generally to estimation of economic loss distributions and measures of these distributions such as Average Annual Loss (AAL) and Probable Maximal Loss (PML) due to wind storms, and more specifically to systems and methods for estimating economic loss distributions due to tropical cyclones (hurricanes and typhoons).

2. Background Information

The development of catastrophe models that can generate a loss exceedance probability curve for a portfolio greatly expands the underwriting options available to insurers. A portfolio manager can use a catastrophe model to calculate the probability that the portfolio loss will exceed a given level or to calculate the probability of experiencing a loss that exceeds the company's survival constraint. The insurer could also examine the effect of changing deductibles and coverage limits on the existing portfolio.

An underwriter's decision to write a new account is based on the magnitude of the risk, its correlation with the existing portfolio, and the highest acceptable price that a client is willing to pay for insurance. In addition, there are factors related to what is being insured (e.g., flammability of a structure, performance of the structure type under wind or earthquake loads), location of the structure (e.g., distance from the coast or to active faults, potential for ground failures such as landslides), and how much can be charged (i.e., regulatory constraints and competitive impacts on rates for a given policy form).

Given a particular event, a catastrophe model is used to calculate a ground-up loss for a particular structure within a portfolio. Since the event is random, an annual rate of occurrence is associated with the structure and, by extension, with the calculated losses. For all possible events with their occurrence rates, calculations of all losses associated with each event can be completed.

Recently, catastrophe risk management companies have become increasingly interested in modeling the wind field of a landfalling hurricane at the highest level possible. A high resolution wind field model is a critical component for assessing prospective property losses in affected coastal and inland areas. During a landfalling hurricane, the wind speeds at a particular location change direction and intensity as the hurricane approaches, and are further impacted by surface roughness features upwind as the storm interacts with land. In order to model wind speeds as accurately as necessary to assess property losses, a high degree of precision in modeling terrain and land use features is required.

Industry standard catastrophe models, such as the Hazus Hurricane Model, use various methods for estimating roughness length based on Land Use Land Cover (LULC) type for an area from one of several available government databases, and then assigning a roughness length to that LULC type. The five Florida Water Management Districts (FWMD) maintain LULC databases that collectively cover the entire state. The data source for the past and current versions of these databases is the National Aerial Photography Program's 1:40,000 scale infrared imagery. Each LULC classification has been assigned a roughness length value by comparing sample LULC classes with aerial photographs of the same location.

The most nationally consistent and up-to-date source of land-use data in the United States is the National Land Cover Data compiled by the Multi-Resolution Land Characteristics (MRLC) Consortium. This is a partnership of six federal environmental monitoring programs along with the EROS Data Center of the U.S. Geological Survey. Their goal was to combine their resources in purchasing Landsat satellite imagery and to use the experience, expertise, and resources of the respective programs to generate LULC data and functional land characteristics databases for the United States. The categories of the MRLC LULC data have been mapped to roughness length values using the same aerial photography approach used to assign roughness length values to the FWMD LULC data.

The Risk Management Solutions United States Hurricane Model (RMS USHU) uses National Land Cover Data (NLCD 92), derived from high resolution satellite data, to approach the problem of accurately modeling the land terrain features and the effect of surface roughness on wind speeds. In order to calculate the effects of surface roughness changes on both mean and gust wind speeds, a surface roughness database containing information on both the surface roughness and its geographical variation is required. This is typically achieved through the use of a ground roughness database that identifies a number of different Land Use/Land Cover (LULC) types. Each land use/land cover type is subsequently mapped to a characteristic roughness length value based primarily on known classification schemes, such as open water, snow/barren, grassland, standard countryside, cultivated countryside, forest, suburban, high density suburban, city center, and skyscraper.

However, seemingly small differences in design and input can significantly impact modeled losses. Hence, the choice of loss model will impact insurer pricing. The imprecision of such modeling apparent in that for any given classification scheme, the model will assign a single roughness length value. However, industry standards indicated that for any given classification scheme, the roughness length for a particular classification scheme can fall within a range of values. It is further known that the AAL for a building in an area with roughness length of, for example, 0.2 will be more than twice that for the same building in an area with a roughness length of 0.5. Accordingly, there is a need for an improved model to more accurately estimate the true roughness length around a particular structure in order to more accurately estimate the AAL therefor.

SUMMARY OF THE INVENTION

The present invention is based on the finding that use of imaging data of a structure of interest and its surrounding area, and use of a three dimensional (3D) model made therefrom, provide for a more accurate estimation of roughness length of an area surrounding the structure. As such, the present invention relates to a system and methods for determining the insurability of a structure of interest using imagining data of the structure and its surrounding area, 3D modeling thereof, and use of computational fluid dynamics (CFD) simulations of wind flow through the 3D model.

In one aspect, the invention provides a method of estimating roughness length of an area surrounding a structure. The method includes obtaining imaging data of the structure and its surrounding area, constructing a three dimensional model of the structure and the surrounding area, and calculating a roughness length of the area surrounding the structure based on the three dimensional model. In certain embodiments, the method may further include performing a computational fluid dynamics (CFD) simulation of wind flow through the three dimensional model to determine local wind speed, and using the Log Wind Profile equation and/or Lettau's formula to calculate roughness length from the local wind speed. In additional embodiments, the method further includes estimating a plurality of additional roughness lengths of additional areas surrounding the structure, wherein the step of calculating includes using a weighted average of the additional roughness lengths. In additional embodiments, the method further includes determining one or more of the average annual loss (AAL), probable maximal loss (PML), and insurance premium of the structure using the calculated roughness length. In additional embodiments, the method further includes determining the insurability of the structure. Such insurability may be determined by comparing the calculated roughness length to a second roughness length of the area surrounding the structure calculated from, e.g., Land Use Land Cover data, wherein if a difference between the second roughness length and the calculated roughness length falls within a threshold value chosen from the interval (−1 to 10), the structure is deemed insurable. In additional embodiments, the CFD simulation includes simulating wind coming from a plurality of directions relative to the structure and calculating a weighted average relative wind speed at the structure.

In another aspect, the invention provides a system for estimating roughness length of an area surrounding a structure. The system includes a data storage device having imaging data of the structure and its surrounding area and program instructions, and a processor coupled to the data storage device, the processor being operable to execute the program instructions to construct a three dimensional (3D) model of the structure and its surrounding area using the imaging data, and calculate a roughness length of the area surrounding the structure using the 3D mode. In certain embodiments, the data storage device may further include program instructions to perform a computational fluid dynamics (CFD) simulation of wind flow through the 3D model to determine local wind speed, and calculating roughness length from the determined local wind speed using the Log Wind Profile equation. In additional embodiments, the data storage device may further include program instructions to estimate a plurality of additional roughness lengths of additional areas surrounding the structure, and the step of calculating comprises using a weighted average of the additional roughness lengths. In additional embodiments, the data storage device may further include program instructions to calculate the insurability of the structure based on the calculated roughness length. In additional embodiments, the data storage device may further include program instructions to determine one or more of the average annual loss (AAL), probable maximal loss (PML), and insurance premium of the structure using the calculated roughness length. In additional embodiments, the data storage device may further include program instructions to simulate wind coming from a plurality of directions relative to the structure and calculating a weighted average relative wind speed at the structure based on the simulated wind and the CFD simulation.

In another aspect, the invention provides a computer-readable storage medium storing instructions, which, when executed by a processor of a server, cause the server to: obtain imaging data of a structure and its surrounding area, construct a three dimensional (3D) model of the structure and its surrounding area, and calculate a roughness length of the area surrounding the structure using the 3D model. In certain embodiments, the computer-readable storage medium may further include instructions, which when executed, cause the server to: perform a computational fluid dynamics (CFD) simulation of wind flow through the 3D model to determine local wind speed and calculate roughness length from the determined local wind speed using the Log Wind Profile equation. In additional embodiments, the computer-readable storage medium may further include instructions, which when executed, cause the server to estimate a plurality of additional roughness lengths of additional areas surrounding the structure and calculate roughness length of the structure using a weighted average of the additional roughness lengths. In additional embodiments, the computer-readable storage medium may further include instructions, which when executed, cause the server to calculate the insurability of the structure based on the calculated roughness length. In additional embodiments, the computer-readable storage medium may further include instructions, which when executed, cause the server to determine one or more of the average annual loss (AAL), probable maximal loss (PML), and insurance premium of the structure using the calculated roughness length. In additional embodiments, the computer-readable storage medium may further include instructions, which when executed, cause the server to configure a wind-storm simulation through the 3D model and calculate the insurance premium of the structure based on the wind-storm simulation and the calculated roughness length.

In yet another aspect, the invention provides a method of calculating local wind speed at a structure. The method includes obtaining imaging data of the structure and its surrounding area, constructing a three dimensional model of the structure and the surrounding area, and performing a computational fluid dynamics (CFD) simulation of wind flow through the 3D model to calculate wind speed. In certain embodiments, the step of performing a CFD simulation includes simulating wind coming from a plurality of directions relative to the structure and calculating a weighted average relative wind speed at the structure. In additional embodiments, the method steps are implemented using a computer processor.

In yet another aspect, the invention provides a method of estimating wind pressure on a structure. The method includes obtaining imaging data of the structure and its surrounding area, constructing a three dimensional model of the structure and the surrounding area, performing a computational fluid dynamics (CFD) simulation of wind flow through the 3D model to estimate wind speed, and calculating wind pressure on the structure using the estimated wind speed and the imaging data of the structure. In certain embodiments, the step of performing a CFD simulation includes simulating wind coming from a plurality of directions relative to the structure and calculating a weighted average relative wind speed at the structure. In additional embodiments, the method steps are implemented using a computer processor.

In yet another aspect, the invention provides a method of determining the insurability of a structure. The method includes obtaining imaging data of the structure and its surrounding area, constructing a three dimensional model of the structure and the surrounding area, calculating a roughness length of the area surrounding the structure based on the three dimensional model, and comparing the calculated roughness length to a roughness length of the area surrounding the structure calculated from Land Use Land Cover data. In certain embodiments, a difference between the second roughness length and the calculated roughness length that falls within a threshold value chosen from the interval (−1 to 10) is indicative of the insurability of the structure. In certain embodiments, the method further includes performing a computational fluid dynamics (CFD) simulation of wind flow through the three dimensional model to determine local wind speed, and using the Log Wind Profile equation and/or Lettau's formula to calculate roughness length from the local wind speed. In additional embodiments, the method further includes determining one or more of the average annual loss (AAL), probable maximal loss (PML), and insurance premium of the structure using the calculated roughness length.

In all aspects, the imaging data may include light detection and ranging (LIDAR) data, aerial photography data, satellite photography data, and any combination thereof. Calculating roughness length may be accomplished by use of the three dimensional model and Lettau's formula. In certain embodiments, the insurability of the structure may be determined by comparing the calculated roughness length to a roughness length of the area surrounding the structure calculated from Land Use Land Cover data. In additional embodiments, the insurability of the structure may be calculated by comparing the calculated roughness length to a threshold value. In additional embodiments, the insurability of the structure may be calculated using the three dimensional model to determine the number of trees having a height greater than a distance from the base of the respective tree to the structure, and comparing the number of determined trees to a threshold value. In additional embodiments, the insurability of the structure may be calculated by comparing the calculated roughness length to a second roughness length calculated from Land Use Land Cover data.

In all aspects, the AAL, PML, or insurance premium of the structure may be determined by configuring a wind-storm simulation through the 3D model with the calculated roughness length. In certain embodiments, the AAL, PML, or insurance premium of the structure is determined by modifying an existing AAL, PML, or insurance premium using the calculated roughness length. In additional embodiments, the existing AAL, PML, or insurance premium is modified by multiplying by a monotonically decreasing function of the calculated roughness length. In additional embodiments, the existing AAL, PML, or insurance premium is modified by a function of the calculated roughness length In additional embodiments, the AAL, PML, or insurance premium for the structure is determined by using the 3D model to determine tree density and tree height of the surrounding area, and configuring a wind-storm simulation using the calculated tree density and tree height.

In all aspects, tree data may be used in the calculations provided herein. In certain embodiments, the tree data includes the number and size of trees in the surrounding area. In additional embodiments, the tree data further includes the number of trees having a height greater than a distance from the base of the respective tree to the structure. In additional embodiments, the tree data further includes tree density and tree height of trees in the area surrounding the structure.

In all aspects, the method steps described herein may be implemented using a computer processor.

DETAILED DESCRIPTION OF THE INVENTION

The present invention is based on the finding that use of imaging data of a structure of interest and its surrounding area, and use of a three dimensional (3D) model made therefrom, provide for a more accurate estimation of roughness length of an area surrounding the structure.

Before the present system and methods are described, it is to be understood that this invention is not limited to particular methods and experimental conditions described, as such methods and conditions may vary. It is also to be understood that the terminology used herein is for purposes of describing particular embodiments only, and is not intended to be limiting, since the scope of the present invention will be limited only in the appended claims.

As used in this specification and the appended claims, the singular forms "a", "an", and "the" include plural references unless the context clearly dictates otherwise. Thus, for example, references to "the method" includes one or more methods, and/or steps of the type described herein which will become apparent to those persons skilled in the art upon reading this disclosure and so forth.

The term "comprising," which is used interchangeably with "including," "containing," or "characterized by," is inclusive or open-ended language and does not exclude additional, unrecited elements or method steps. The phrase "consisting of" excludes any element, step, or component not specified in the claim. The phrase "consisting essentially of" limits the scope of a claim to the specified components or steps and those that do not materially affect the basic and novel characteristics of the claimed invention. The present disclosure contemplates embodiments of the invention system and methods corresponding to the scope of each of these phrases. Thus, a method comprising recited elements or steps contemplates particular embodiments in which the method consists essentially of or consists of those elements or steps.

Unless defined otherwise, all technical and scientific terms used herein have the same meaning as commonly understood by one of ordinary skill in the art to which this invention belongs. Although any methods and components similar or equivalent to those described herein can be used in the practice or testing of the invention, the preferred methods and materials are now described.

Figure 1:
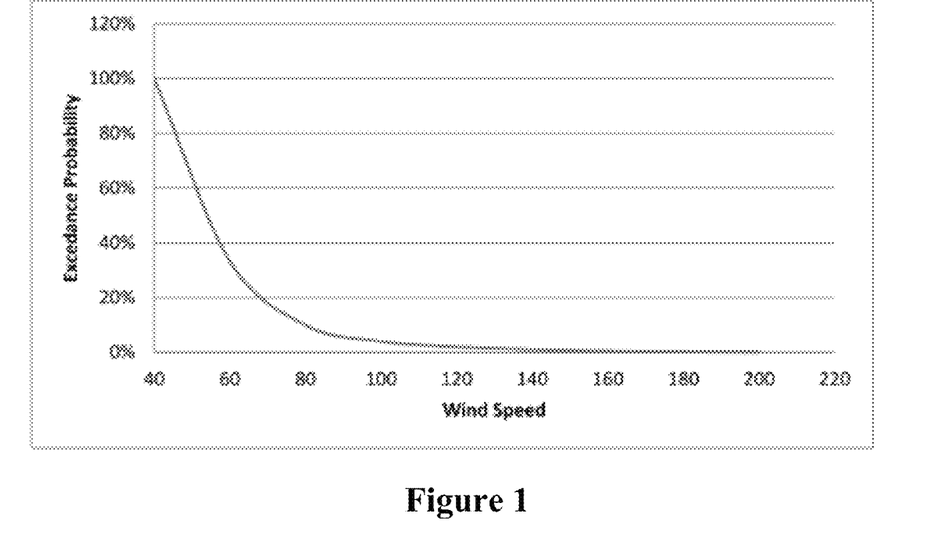
FIG. 1 is a graphical diagram showing a typical wind speed exceedance probability during a single year.
Figure 2:
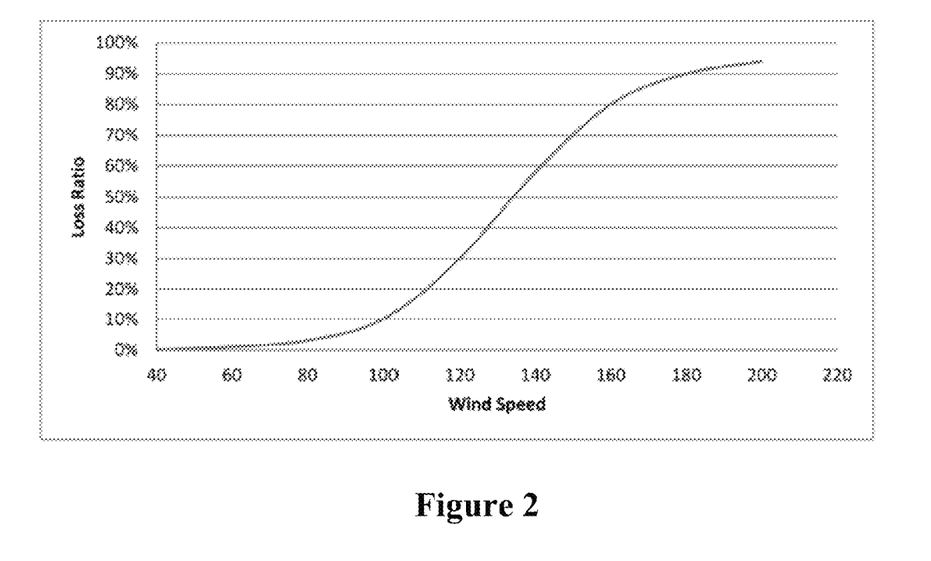
FIG. 2 is a graphical diagram showing a sample loss ratio as a function of wind speed for a given structure.

There are two basic questions that need to be answered to estimate economic loss distributions for a property: (1) What is the annual wind speed exceedance probability distribution at the property's location?; and (2) What are the likely losses for this building type as a function of wind speed? The loss distributions can be calculated from these two functions. As a simple illustration, FIG. 1 shows a typical wind speed exceedance distribution and FIG. 2 shows a sample loss function for a particular structure. It should be understood that "loss ratio," as used in this example, refers to the losses as percentage of total building value. As used herein, the term "structure" and "structure of interest" are used interchangeably to refer to any building or edifice for which a user may seek insurance. As such, the term "structure" is contemplated to include, but is not limited to, a building, a shop, house, development, or complex. Also encompassed by the term "structure" is a plurality of any such exemplified buildings.

Thus, when used for calculating loss distributions, Average Annual Loss (AAL), and Probable Maximal Loss (PML) for a property, catastrophe models essentially boil down to estimating these two distributions. As used herein, "Average Annual Loss" or "AAL" refers to the expected loss to a given structure or property per year from a catastrophic event and its annual rate, summed over all events that cause a loss. Based on cumulative rates of occurrence, an exceedance probability (EP) curve may then be generated, as shown in FIG. 1. It is important to note how a relatively small change in wind speed can have a large impact on loss ratio. For example, FIG. 2 shows that increasing the wind speed from 100 mph to 120 mph almost triples the expected loss ratio.

Once the insurer has determined at what point along the EP curve consideration of risk financing options should start, the next question is to determine the amount of financial protection desired. Companies often determine the amount of risk to retain and which risks to finance based on the concept of Probable Maximal Loss (PML). As used herein, "Probable Maximal Loss" or "PML" refers to a measure of risk corresponding to the largest loss the structure can reasonably be expected to experience due to a catastrophic event.

Within known catastrophe model simulations, there are many parameters that can affect the shape of the two distributions, as shown in FIGS. 1 and 2. One of the most important is a parameter called roughness length, often denoted $Z_o$, which is a function of the height and spacing of the buildings, trees, and other obstructions on the ground surface surrounding the structure of interest. Without being bound by theory, the basic concept is simple: obstacles, such as buildings and trees (usually) slow down the wind. The number, size, and density of such obstacles upwind from a structure will greatly affect the actual wind speeds and damage experienced by the structure. Thus, as the ground surface becomes rougher, the wind speeds near the ground decrease, although the upper level wind speed remains the same. The wind loads experienced by structures located in a typical suburban, treed, or urban environment are much lower than those experienced by buildings located in relatively unobstructed regions such as waterfront and open field locations. The wind loads experienced by one- and two-story structures located in forested areas may be as low as one half of those experienced by similar structures located in open environments.

Numerous studies have been performed over the last several decades attempting to categorize $Z_0$ using surface exposure descriptions. However, to date, no consistent agreement has been reached among researchers. Wieringa (1992, 1993) summarized most of the traceable studies on roughness lengths for various terrains performed in the last 30 years including field projects, numerical modeling studies, and wind tunnel investigations and summarized best estimates for $Z_0$. Over the years, the estimates for $Z_0$ have varied somewhat, but may typically be summarized for different land use classifications, as shown in Table 1:

| Land Use Land Cover (LULC) | Roughness Length ($Z_0$) Range |
| --- | --- |
| Open Land | 0.01 m-0.07 m |
| Low Density Residential | 0.1 m-0.3 m |
| Medium Density Residential | 0.1 m-.5 m |
| High Density Residential | 0.1 m-0.8 m |
| Commercial | 0.2 m-0.8 m |
| Industrial | 0.2 m-1.0 m |
| Cities | 0.5 m-3.0 m |
| Forests | 0.4 m-1.5 m |

Figure 3:
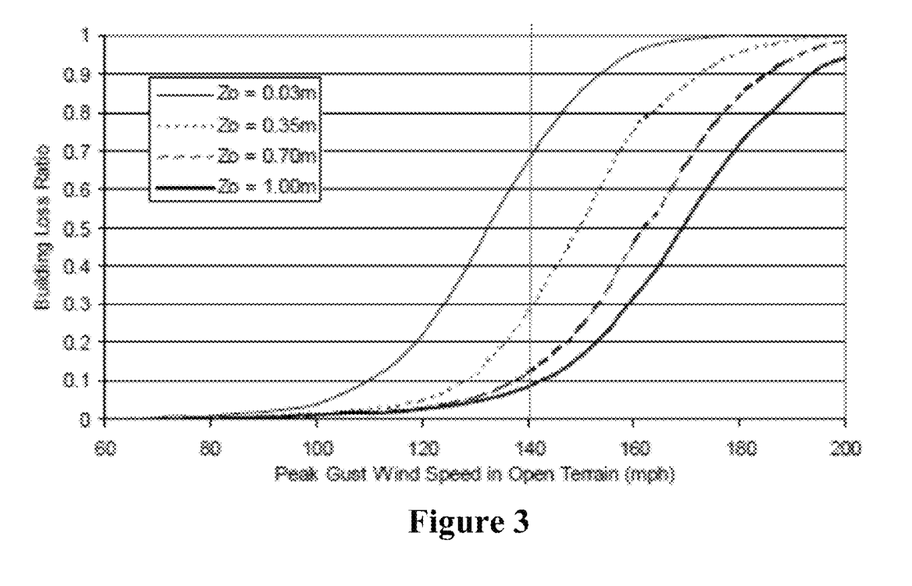
FIG. 3 is a graphical diagram showing loss functions for a residential building for various roughness lengths.

Given the open terrain wind speed, the characteristic roughness length, and the fetch over which the wind has blown over the surface, it is possible to estimate the local wind speeds at any height. To illustrate how significant the effect can be, FIG. 3 shows loss functions for a residential building for different roughness length values. As a simple illustration of how much roughness length affects losses, consider that in a 140 mph hurricane, expected losses for the same building in open terrain ($Z_0$=0.03 m) are over six times higher than for the same building (in the same hurricane) located in some high density residential, commercial, or industrial areas. The graph in FIG. 3 also shows that simply knowing the land use around a particular building does not give a precise estimate of likely damages. This can be seen by looking at the curves for $Z_0$=0.35 m and $Z_0$=0.70 m. From Table 1, it's clear that both of these values fall well inside the range of roughness lengths encountered in "Commercial" land use areas. However, in a 140 mph hurricane, the expected losses from the former are approximately 2.5 times higher than the latter.

As can be contemplated, trees have a very nonlinear effect on wind storm losses. In some situations, trees around a building provide a buffering effect and significantly reduce wind loads and losses. However, in a severe catastrophic event, fallen trees and limbs can cause major losses. There is evidence that, due mostly to traditional reporting practices, damage from trees in hurricanes is dramatically under-estimated by most insurers. For example, a claim from Hurricane Ike, where a tree fell on a house is illustrative. The cost to remove the tree from the home was $2,500, the cost to repair the home was $35,000, and the cost to remove the tree and building debris was $1,800. In the insurer's database, there was a $39,300 "wind/storm damage" claim where $1,800 was sub-classified as debris removal. Although the proximate cause of the claim was a fallen tree, that information was not captured anywhere in the claims database.

A study by the Ohio Insurance Institute found that of the 100,000+ claims and $550M in damage caused by Hurricane Ike, over 50% were caused by fallen trees. Similarly, an insurance agency in Houston estimated that 40% of claims filed for Hurricane Ike were due to fallen trees. Another study of a large insurer's claims from Hurricane Bob in 1991 found that 50% of structural losses were due to fallen trees and limbs. These studies provide strong evidence that structures with large trees within striking distance have significantly higher loss costs than those without.

Damage from trees is usually simulated by using tree-density estimates in an area coupled with blowdown probability functions. Similar to roughness length, "tree density" is commonly estimated from government LULC databases at a census tract or zip code level. While tree density over a tract or zip code level is correlated with tree damage, the majority of tree damage is caused by trees or limbs that actually fall on a structure. Thus, knowing the number and size of trees that are within striking distance of a building or structure will enable much more precise estimates of the tree damage component of AAL.

Mathematical simulation of hurricanes is the most accepted approach for estimating wind speeds for the design of structures and assessment of hurricane risk. The basic approach in all previously published hurricane simulation studies is the same in that site specific statistics of key hurricane parameters (including central pressure difference ($\Delta p$), Holland pressure profile parameter (B), radius to maximum winds ($R_{max}$), heading ($\theta$), translation speed (c), and the coast crossing position or distance of closest approach ($d_{min}$) are first obtained. Given that the statistical distributions of these key hurricane parameters are known, a Monte Carlo approach is used to sample values from each of the aforementioned distributions and a mathematical representation of a hurricane is passed along the straight line path, satisfying the sampled data, while the simulated wind speeds are recorded. (See, *Hazus-MH* 2.0 *Technical Manual*, FEMA, fema.gov/plan/prevent/hazus, which is incorporated herein by reference in its entirety). When coupled with the wind field model, hurricane wind speeds can be computed at any point along or near the hurricane coastline. The model is able to reproduce the continually varying hurricane statistics along the US coastline, and can treat multiple landfalling storms, by-passing storms, storm curvature and reintensification in cases where the storm re-enters the water before making a second or third landfall.

Accordingly, the present invention provides a method of calculating the insurability of a structure. The method includes obtaining imaging data of the structure and its surrounding area, constructing a three dimensional (3D) model of the structure and its surrounding area, calculating a roughness length of the area surrounding the structure based on the three dimensional model, and comparing the calculated roughness length to a roughness length of the area surrounding the structure calculated from Land Use Land Cover data to thereby calculate the insurability of the structure.

Figure 4:
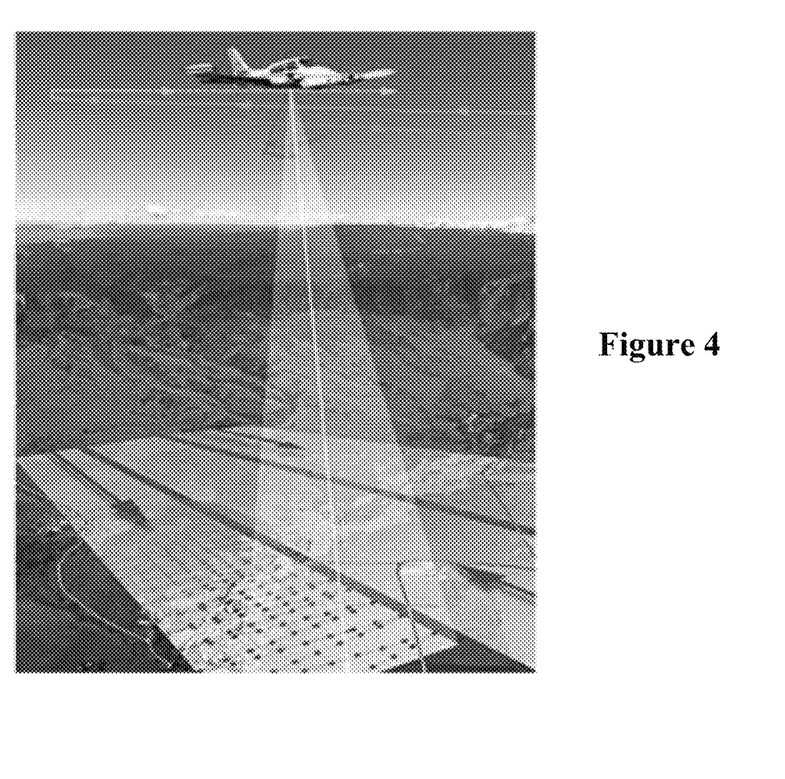
FIG. 4 is a pictorial diagram showing airplane-based LIDAR data collection.

Exemplary imaging data of a particular structure and its surrounding area includes, but is not limit to Light Detection And Ranging (LIDAR) data, aerial photography data, satellite photography data, and any combination thereof, for the area surrounding the geographic location of interest. As used herein, "Light Detection and Ranging" or "LIDAR" refers to an optical remote sensing technology that can measure the distance to, or other properties of a target by illuminating the target with light, often using pulses from a laser. LIDAR uses ultraviolet, visible, or near infrared light to image objects and can be used with a wide range of targets, including non-metallic objects, rocks, rain, chemical compounds, aerosols, clouds and even single molecules. A narrow laser beam can be used to map physical features with very high resolution. Thus, when LIDAR equipment is attached to an airplane, as shown in FIG. 4, data about the three dimensional (3D) structure of the earth, buildings and trees can be gathered. One or more aerial or satellite photographs can also be used to determine the 3D structure of the natural and built environment surrounding the structure.

It should be understood that the imaging data may be obtained from any of various governmental databases. The aerial photography available for the Florida Panhandle area is in the format of Digital Orthophoto Quarter Quadrangles (DOQQ). The DOQQs are rectified aerial photos with 1 m resolution (which is the highest resolution currently available) obtained from Florida Resources & Environmental Analysis Center at Florida State University. The mapping function for this area was developed by overlaying the DOQQs on the land use coverage obtained from the Northwest Florida Water Management District (NWFWMD). A number of aerial photo samples were then identified for each land use category, which formed the basis for the development of mapping functions (using engineering judgment and referring to the published literatures on roughness length determination, as well).

Even with the help of aerial photos, it is still not trivial to define the mapping function for each land use category due to numerous factors affecting the roughness length, including primarily, the size, shape, density, and distribution of the surface obstacles and the upwind fetch distances. Thus, in many circumstances it would be preferable to obtain current/accurate imaging data directly from a LIDAR-equipped airplane, aerial photographs, and/or satellite photographs.

Figure 5:
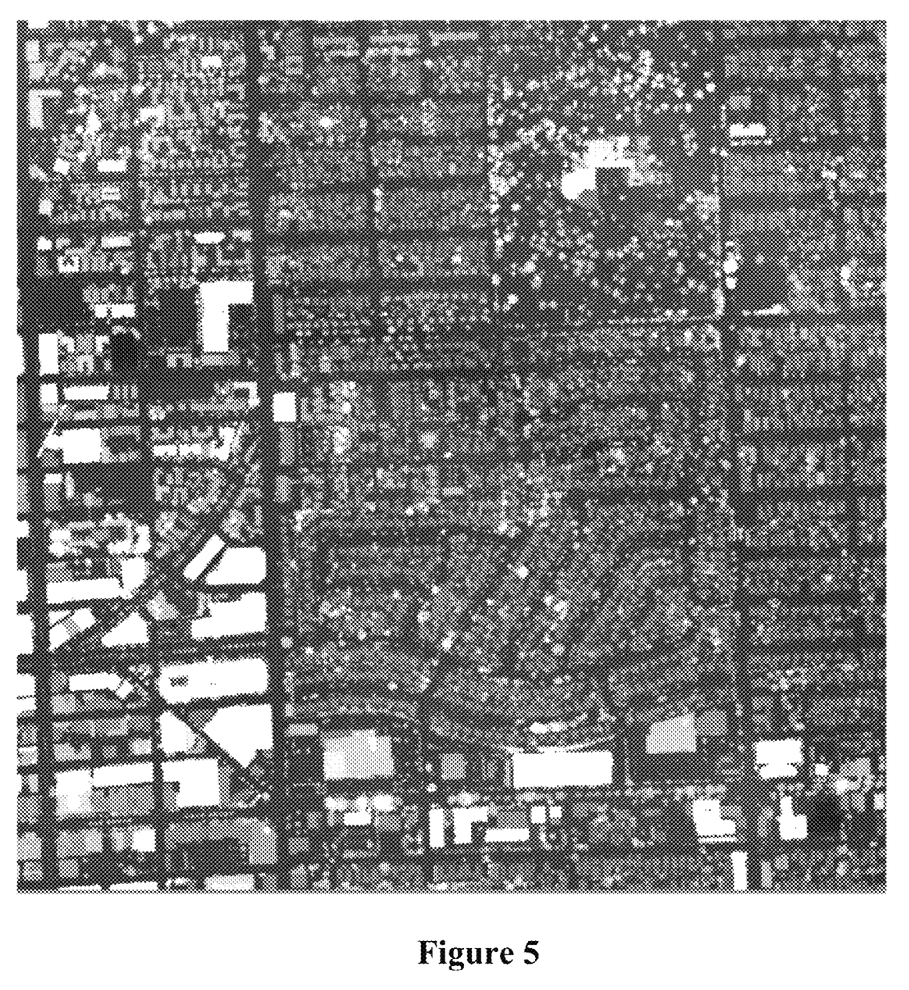
FIG. 5 is a pictorial diagram showing a raw LIDAR image of approximately one square mile in Miami, Fla.

Using the imaging data of the structure and its surrounding area, a 3D model of the structure and its surrounding area may then be constructed using specialized software in a computer and/or processor. FIG. 5 shows an image of raw LIDAR data for approximately one square mile of Miami, Fla., where the intensity of the image indicates height of the object (lighter areas are taller than darker areas). Thus, the software uses the intensity of the structures and terrain within the image data to construct a 3D model, as shown in FIG. 6.

Commonly used in airplane and Formula I car design, computational fluid dynamics (CFD) simulations model the physics of wind flow around objects. CFD simulations provide a much more accurate measure of how obstacles affect wind speeds than the Land Use/Land Cover approach currently used in industry wind-storm simulations. Accordingly, the present invention contemplates use of open-source and commercially available CFD simulation software for such simulations. Exemplary CFD simulation software useful in the system and methods of the present invention includes, but is not limited to, OPENFOAM® (openfoam.com); OpenFlower (sourceforge.net/projects/openflower); FLASH (flash.uchicago.edu); GADGET (mpa-garching.mpg.de/~volker/gadget); HYDRA (hydra.mcmaster.ca/hydra); ZEUS-MP (lca.ucsd.edu/portal/software); ANSYS CFX (ansys.com/Products/Simulation+Technology/Fluid+Dynamics); ANSYS ICEM CFD (ansys.com/Products/Other+Products/ANSYS+ICEM+CFD); FLUENT (fluent.com); COMSOL Multiphysics (comsol.com/products/multiphysics); CFDRC (cfdrc.com); STAR-CD (cd-adapco.com); and FLOW3D (flow3d.com).

Figure 6:
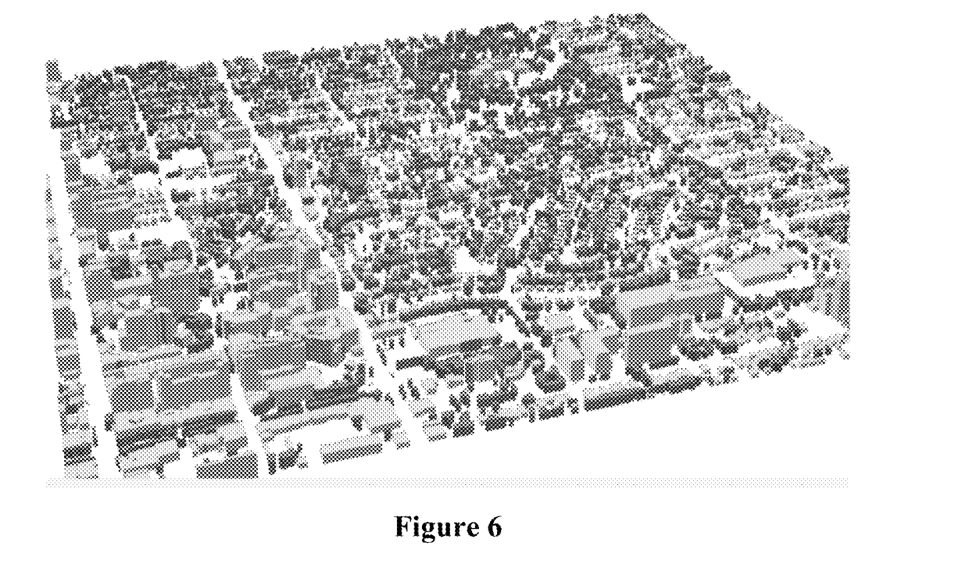
FIG. 6 is a pictorial diagram showing a three dimensional model constructed from LIDAR data and/or aerial and satellite photographs.
Figure 7:
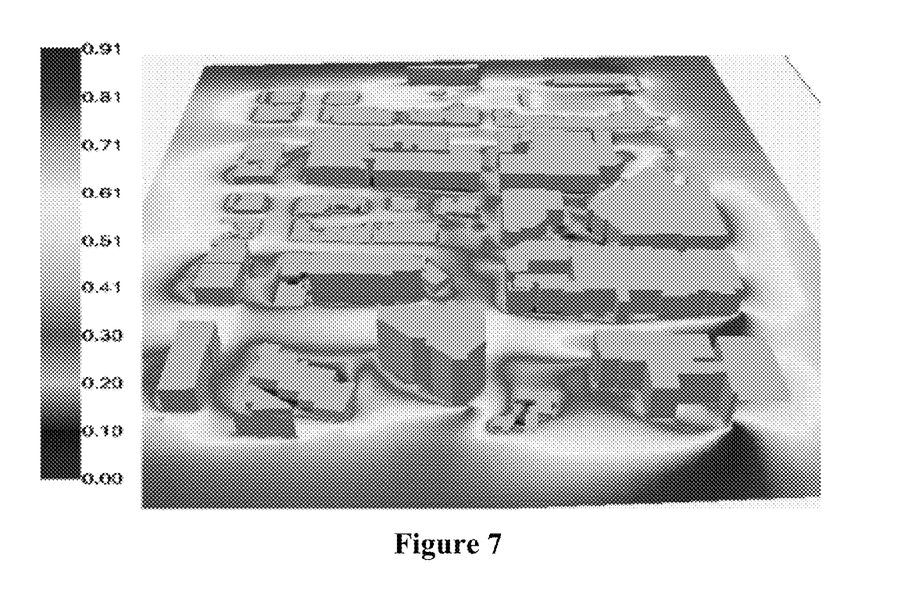
FIG. 7 is a pictorial diagram showing the results of a computational fluid dynamics simulation of wind speeds at different points over a several block area in Miami, Fla.

FIG. 7 shows a CFD simulation of the lower left part of FIG. 6. Using the LULC approach, the entire area would be assigned the same "City Center" roughness length and consequently the same wind speed for wind-storm simulations. The shading showing in FIG. 7 indicates the relative wind speed at a height of 10 m for wind coming from the east. It is readily apparent that some buildings experience winds that are only 20%-30% of the "open-terrain" wind speed, while others experience wind speeds 90% of the open terrain wind speed. By converting relative wind speeds to roughness length (as demonstrated in Example 1, below), it can be seen that the effective roughness length over this small area for wind from the east ranges from as low as 0.3 to as high as 2.0. This translates into damage estimates that differ by over 300%.

By running CFD simulations with the wind coming from several different directions, a weighted average relative wind speed for a particular location can be calculated, and from that relative wind speed, a roughness length can be calculated. The composite roughness length for the area shown in FIG. 7 ranges from 0.3-0.9.

Roughness length may be calculated by any of various known equations. For example, given two wind speeds v1 and v2, at two different heights h1 and h2, an effective roughness length $Z_0$ can be calculated by the following form of the Log Wind Profile equation:

$$Z_0 = e^{(v2*ln(h1) - v1*ln(h2))/(v2-v1)} \qquad (II)$$

This roughness length value, however, is still an underestimate of the real roughness length because the CFD simulations implicitly assume that there is open-terrain (i.e., an extremely low roughness length) upwind of the simulated area. To adjust for this, a roughness length is calculated for a much larger area using a 3D model (similar to the one shown in FIG. 6) using Lettau's formula:

$$Z_0 = 0.5 * H * S / A \qquad (I)$$

where H is the average height of obstacles (e.g., trees, buildings, land masses, etc.) in an area, S is the total frontal surface area of all obstacles "seen" by the wind (measured in the vertical-crosswind-lateral plane), and A is the total ground area. (Lettau, H., 1969: Note on aerodynamic roughness-parameter estimation on the basis of roughness-element description. *Appl. Meteorol.* 8, 828-832, incorporated herein by reference). The three parameters H, S, and A can be calculated directly from the 3D model for various wind directions. Thus, it is easy to demonstrate that different instances of geographic areas with the same LULC classification have very different roughness lengths when calculated via Lettau's formula.

Other formulas similar to Lettau's formula may be used to calculate the roughness length directly from the 3D model. For example, the following formula could be used:

$$Z_0 = (h - Z_d) * \exp(-K / \text{sqrt}(0.5 * C_{Dh} * l_f)) \qquad (III)$$

where h is the volumetrically averaged building height, $Z_d$ is the zero displacement height, K is von Karman's constant (0.4), $C_{Dh}$ is the isolated obstacle drag coefficient (0.8) and $l_F$ is the frontal area density. $Z_d$ may be calculated as follows:

$$Z_d = h * (l_p)^{0.6} \qquad (IV)$$

where $l_p$ is the plan area density.

When trees or bushes are present, not only must their contribution to the frontal area affecting wind speed be considered, but also their potential to cause damage to the building. Accordingly, using the 3D model prepared herein, the number and size of the trees within a given distance of the structure of interest may be ascertained. However, such information may also be obtained from relevant governmental databases. In addition, the 3D model may also be used to determine the number of trees having a height greater than the distance from the base of the respective tree to the structure. This number of trees may then be used to modify the loss distribution or determine the insurability of the structure by configuring a catastrophe model with the more precise estimates or comparing them to less precise estimates such as those from the United States Forest Service's Forest Inventory Analysis (FIA) database or the Multi-resolution Land Characteristics (MRLC) land cover database.

Wind loads on buildings are usually estimated using either boundary layer wind tunnel tests performed for a specific building or using code-specified loads that have been developed by committees from boundary layer wind tunnel test data. If wind tunnel loads are used in the design of a building or its components, the wind loading coefficients are typically measured for 36 different wind directions, with the results combined with a statistical model of the wind climate for the location where the building is to be built. Using this approach, the design loads obtained for the building take into account the effect of the variation of the wind loads with the direction of the approaching wind, and how these variations in load with direction align with the directional characteristics of the wind. The magnitudes of the wall pressures used for modeling wind loads for the prediction of wind induced failures of components and cladding were derived considering the pressure coefficients given in North American wind loading standards and/or codes. Exemplary standards/codes considered in the development of wind loads include, but are not limited to, American Society of Civil Engineers (ACSE) guidelines, such as ACSE-7-05 and ASCE-7-95, guidelines from the Southern Building Code Congress International (SBCCI), and guidelines from the National Building Code of Canada. Wind induced damage to high-rise buildings is currently modeled as being associated with wind induced failure of components (i.e., windows) and damage to windows caused by windborne debris. The maximum magnitudes of the directionally dependent exterior cladding pressure load model are set equal to the peak values given in ASCE-7-02, and information on directionality was derived using data given in Djakovich (1985) and the 1995 Version of the British Wind Loading Standard, CP3. (See, *Hazus-MH* 2.0 *Technical Manual*, FEMA, fema.gov/plan/prevent/hazus).

The effect of wind directionality is taken into account using available wind tunnel data, scaled (or truncated) to ensure the maximum values of the pressures are equivalent to the code specified values. The reduction in the roof loads associated with decreased wind speeds caused by increasing surface roughness is lessened through the use of a turbulence intensity adjustment factor, which yields a final reduction in wind loads comparable to that specified in, for example, ASCE-7-95. However, such commonly used techniques still remain inaccurate.

Accordingly, in another aspect, the invention provides a method of calculating local wind speed at a structure. The method includes obtaining imaging data of the structure and its surrounding area, constructing a three dimensional model of the structure and the surrounding area, and performing a computational fluid dynamics (CFD) simulation of wind flow through the 3D model to estimate wind speed. It is important to note that there are well known relationships between roughness length, wind speed, and wind pressure on a structure to those skilled in the art. As such, calculating a more precise roughness length can be converted to a more precise wind speed estimate (or vice versa), or a more precise wind pressure estimate.

In yet another aspect, the invention provides a method of estimating wind pressure on a structure. The method includes obtaining imaging data of the structure and its surrounding area, constructing a three dimensional model of the structure and the surrounding area, performing a computational fluid dynamics (CFD) simulation of wind flow through the 3D model to estimate wind speed, and calculating wind pressure on the structure using the estimated wind speed and the imaging data of the structure.

Catastrophe models configured with the more precise roughness calculated by the current method can also be used to estimate the entire loss distribution and other measures of the loss distribution such as probable maximal loss (PML) for various return periods. One or more of these additional measures may be used to calculate an insurance premium for the property. For example, a total premium is sometimes calculated as a sum of the AAL and a function of the structure loss distribution that estimates the additional cost of capital required to cover larger than average losses.

Premium=AAL+*f*(structure loss distribution, portfolio loss distribution, industry loss distribution)

The actual calculation of f(structure loss distribution, portfolio loss distribution, industry loss distribution) can be complex, however the various methods for doing so are known to those skilled in the art. However, without being bound by theory, such a function takes into account the estimated structure loss distribution, portfolio loss distribution, and industry loss distribution over a given period of time.

In addition to configuring catastrophe models with a more precise roughness length to directly calculate AAL, PML, other measures of the loss distribution, or premium, existing estimates of those parameters may be modified using the more precise roughness length calculated by the current method. More specifically, the parameters may be modified by a function *f*(existing parameter, existing roughness length, new roughness length) that maps the existing parameter estimate to a more precise estimate. For example, if an insurer has a proprietary method that determines the AAL for the structure in the above example to be $1.00, that AAL could be modified directly as follows:

New AAL=$1.00*1/log(4.6/0.41)

where 4.6 is the more precise roughness length estimate and 0.41 is the less precise estimate from the LULC database. While 1/log(precise roughness length/original roughness length) is one function that may be used to map existing parameter estimates to more precise ones, many related functions may be used to effect the mapping. Those functions will share the following properties:

(1) As roughness length increases, AAL, PML, premium, and other related measures of the loss distribution decrease.

(2) As roughness length increases, the effect of an incremental increase in roughness length on AAL, PML, premium, and other related measures decreases.

In addition to modifying loss distribution measures using the roughness length calculated by the methods described herein, the insurability of the structure (i.e., the decision of whether or not to insure the structure) may also be determined directly from the calculated roughness length. A determination of insurability of a structure may thus be made by comparing the calculated roughness length to a second roughness length that is determined using, e.g., LULC data. If the difference in the calculated roughness length and the second roughness length is less than a threshold value chosen from the interval (−1 to 10), (i.e., −1, 0, 1, 2, 3, 4, 5, 6, 7, 8, 9, 10, and any fraction thereof), then the structure may be deemed uninsurable depending on the risk appetite of the insurer. For example, if the calculated (i.e., more precise) estimate of the roughness length is more than 0.1 lower than a less precise estimate of the roughness length, the structure may be deemed uninsurable. Alternatively, if the roughness length of the structure is below a certain value (e.g., 0.2), the structure may be deemed uninsurable. Thus, such modifications may be made by comparing the calculated roughness length to a threshold value, or by comparing the difference between the calculated roughness length and a second (less precise) estimate of the roughness length to a threshold value.

In addition to using the 3D model to calculate a more precise roughness length, the 3D model may also be used to calculate more precise estimates of the number and size of trees located within a given distance from the building. Analogous techniques to those described above for roughness length can be used to modify loss distributions and determine insurability based on the more precise tree parameter estimates from the 3D model. Consequently, the techniques described above for modifying AAL, PML, and other measures of the loss distribution could be done using wind speed or wind pressure instead of roughness length. Once wind speed and/or wind pressure are estimated, a traditional windstorm simulation model can be configured using the roughness length and tree data described above.

The exemplary embodiments described herein can be used with computer hardware and software that perform the methods and processing functions described above. Exemplary computer hardware include smart phones, tablet computers, notebooks, notepad devices, personal computers, personal digital assistances, and any computing device with a processor and memory area. As will be appreciated by those having ordinary skill in that art, the systems, methods, and procedures described herein can be embodied in a programmable computer, computer executable software, or digital circuitry. The software can be stored on computer readable media. For example, "computer-coded," "software," "scripts," "computer-readable software code," and "programs" are software codes used interchangeably for the purposes of simplicity in this disclosure. Further, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Figure 11:
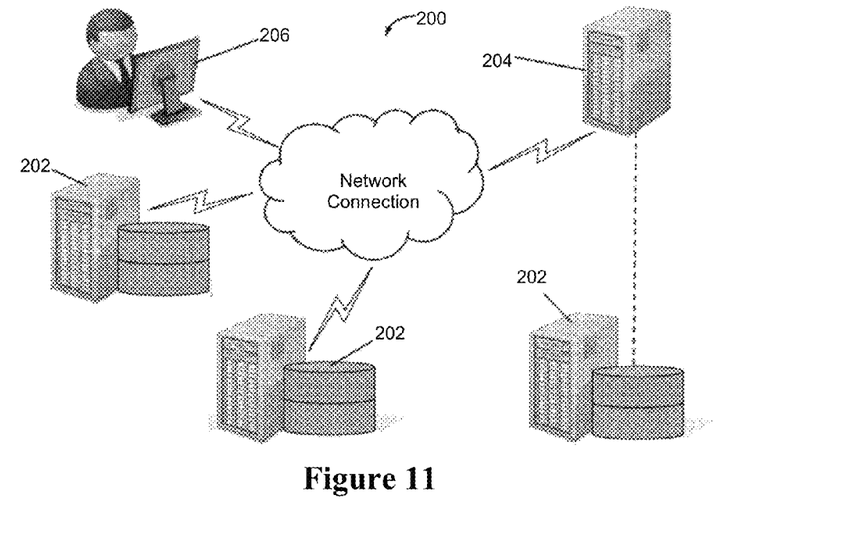
FIG. 11 is a schematic diagram showing a system for estimating roughness length of an area surrounding a structure and/or estimating the insurability of the structure.

With reference now to FIG. 11, the present invention also provides a system 200 for estimating roughness length of an area surrounding a structure. The system includes one or more database servers 202, and one or more user interfaces 206. The system may further include one or more applications servers 204. The one or more database servers 202, one or more user interfaces 206, and one or more applications servers 204 are in electronic data communication with the user interface 206 via any suitable network connection (e.g., Ethernet connection, Digital Subscriber Line (DSL), telephone line, coaxial cable, etc.) so as that the system 200 forms a communications network (e.g., Local Area Network (LAN), Wide Area Network (WAN), Virtual Private Network (VPN), etc.). That communications network is preferably formed by secured network connections so as to protect the system 200 from unauthorized access.

At least one applications server 204, at least one database server 204, and at least one user interface 206 provide the primary functionality of the present invention via a multitiered architecture. However, it should be understood that the applications server and the user interface may be the same machine. The applications server 204 operates as the business logic tier, or middle tier, by coordinating the applications, process commands, and logical decisions and evaluations that provide the functionality of the present invention. The applications server 204 also moves and processes data between the database server 202 and the user interface 206. The database server 202 operates as the data tier, or lower tier, by utilizing a database computer language (e.g., Structured Query Language (SQL), Extensible Markup Language (XML), etc.) to store and retrieve the data required to provide the functionality of the present invention in a relational database management system (RDBMS). And the user interface 206 operates as the presentation tier, or upper tier, by providing a graphical user interface that translates tasks and results into information a user can understand. The user interface 206 also provides a mechanism for a user to manually input data into the system 200. That multi-tiered architecture improves scalability and supports cost-efficient application building. And although a separate database server 202 is described as operating the data tier, it should be understood that the applications server 204 may operate the data tier instead of the database server 202 without departing from the spirit of the invention.

The applications server 204 is integrated or interfaced with the one or more database servers 202 to facilitate the exchange of data between the applications server 204, the one or more database servers 202, and the one or more user interfaces 206. For example, the applications server 204 may use an automated process to identify and extract the various imaging data available from governmental databases regarding LULC information of a given area surrounding a structure of interest. The applications server 204 may also use an automated process to extract specific data about a structure of interest in order to determine the insurability of the structure. The applications server 204 may also use the extracted data regarding the specific structure to construct a three dimensional (3D) model of the structure and its surrounding area using the imaging data and to perform a computational fluid dynamics (CFD) simulation of wind flow through the 3D model to determine local wind speed. In addition to or as an alternative to those automated processes, a user may also obtain various data from those databases via manual access techniques (e.g., browsing web pages and downloading data, browsing web pages and/or electronic documents and cutting and pasting data, etc.).

The functionality of the system of the present invention is preferably provided using web-based applications. In that way, a user (e.g., broker, account manager, administrator, etc.) can access the functionality of the system via a user interface 206 (e.g., personal computer, laptop computer, personal digital assistant (PDA), smart phone, etc.) using industry standard web browsers (e.g., the CHROME brand web browser from Google, Inc., the FIREFOX brand web browser from the Mozilla Foundation, the INTERNET EXPLORER brand web browser from the Microsoft Corporation, etc.). Preferably, the functionality of the present invention is accessed via a user interface 206 using a secure communication protocol (e.g., Hypertext Transfer Protocol Secure (HTTPS), Internet Protocol Security (IPsec), Datagram Transport Layer Security (DTLS), Secure Socket Tunneling Protocol (SSTP), etc.) so as to protect the applications server 204 and database servers 202 from unauthorized access.

Figure 12:
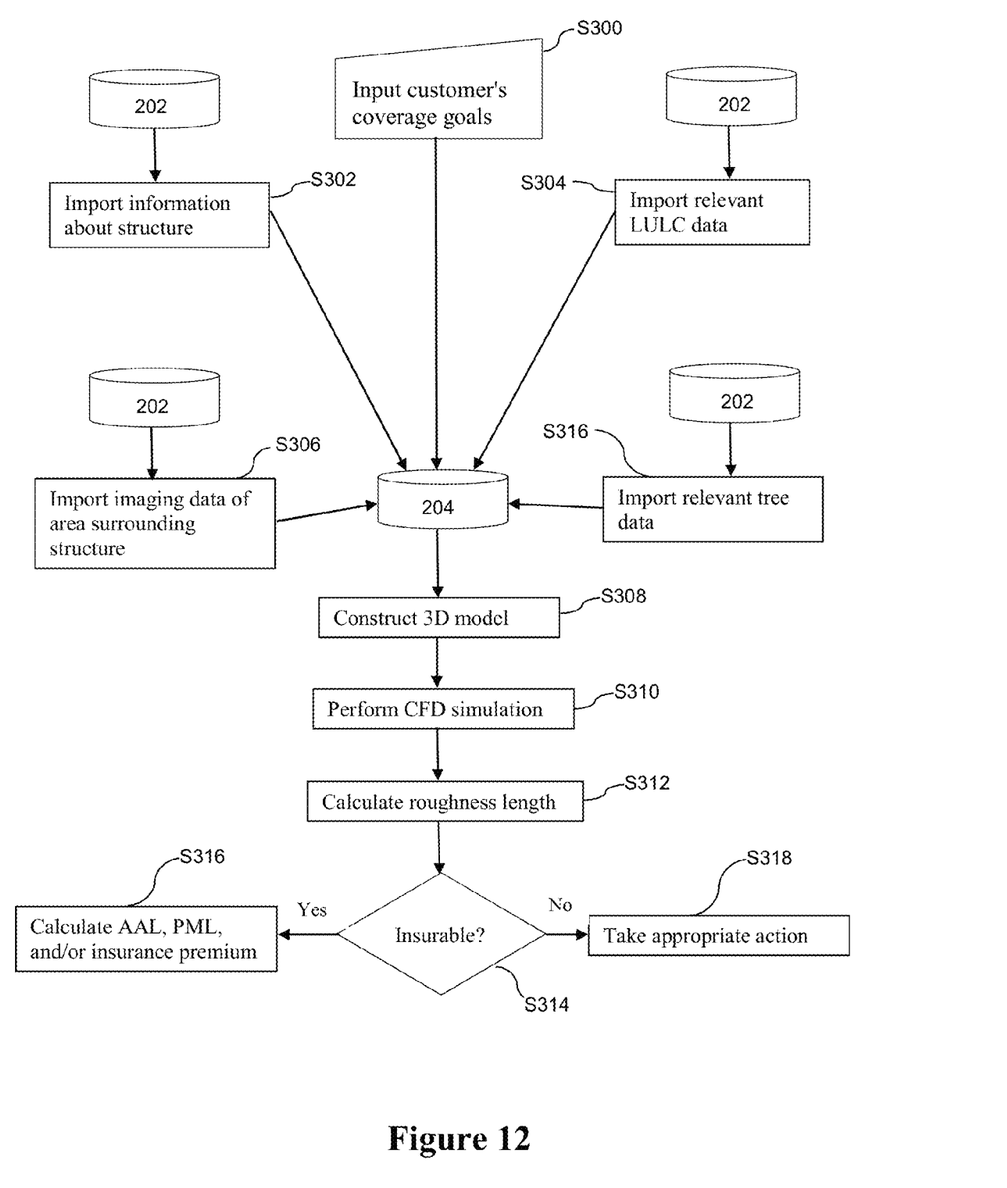
FIG. 12 is a flow chart illustrating an exemplary process implemented by the system for estimating roughness length of an area surrounding a structure and/or estimating the insurability of the structure.

FIG. 12 is a flow chart illustrating an exemplary process implemented by the system of the present invention to estimate the roughness length of an area surrounding a structure of interest and/or estimate the insurability of the structure itself. At step S300, a user defines the specific coverage that the customer needs and/or desires by inputting various parameters into the applications server 202 via user interface 206. For example, the user can input the address of the structure of interest, the customer's business type, etc. At step S302, the applications server 204 imports specific information about the structure and its surrounding area from various governmental databases. At step S304, the applications server 204 imports relevant LULC data from various governmental databases. At step S306, the applications server 204 imports imaging data of the structure and the area surrounding the structure from various governmental databases. In certain embodiments, the applications server 204 will also import tree data regarding the number and size of trees in the surrounding area.

As discussed above, at step S308, the applications server 204 constructs a 3D model of the structure and its surrounding area using the imaging data. At step S310, the applications server 204 performs a computational fluid dynamics (CFD) simulation of wind flow through the 3D model to determine local wind speed. At step S312, the roughness length of the structure is calculated from the determined local wind speed using the Log Wind Profile equation and/or Lettau's formula. The applications server 204 may further import relevant tree data regarding the number and sizes of trees in the surrounding area (S316). In certain embodiments, step S312 also includes estimating a plurality of additional roughness lengths of additional areas surrounding the structure, and the calculated roughness length is a weighted average of the additional roughness lengths. In certain embodiments, step S312 also includes comparing the calculated roughness length to a second roughness length calculated from the Land Use Land Cover data.

At step S314, the applications server 204 then determines if the structure is insurable as discussed above, and in accordance with the qualifications and risk appetite of the insuring company. If it is determined that the structure is insurable, the applications server 204, may then determine one or more of the average annual loss (AAL), probable maximal loss (PML), and insurance premium of the structure using the calculated roughness length (S316). If it is determined that the structure is not insurable, then the applications server 204 prompts the user via the user interface 206 to take appropriate action.

As discussed above, the method steps described herein may be performed by any computer hardware. As will be appreciated by those having ordinary skill in that art, the systems, methods, and procedures described herein can be embodied in a programmable computer, computer executable software, or digital circuitry. The software can be stored on computer readable media. Accordingly, in another aspect, the invention provides a computer-readable storage medium storing instructions, which, when executed by a processor of a server, cause the server to: obtain imaging data of a structure and its surrounding area, construct a three dimensional (3D) model of the structure and its surrounding area, and calculate a roughness length of the area surrounding the structure using the 3D model, as described above.

The following examples are intended to illustrate but not limit the invention.

EXAMPLE 1

To illustrate the difference in Average Annual Loss (AAL) estimates that can occur as a result of using inaccurate roughness length parameters, two different AAL's will be calculated for an exemplary building in Miami, Fla. The first will use the industry standard Land Use/Land Cover (LULC) to estimate roughness length. The second will use the methodology of the present invention. The Federal Emergency Management Agency's (FEMA) HAZUS 2.0 hurricane simulation software will be used in both cases. Although other catastrophe models may give different absolute AAL estimates, the relative difference in the estimates between the two roughness length estimation methods would be similar.

Figure 8:
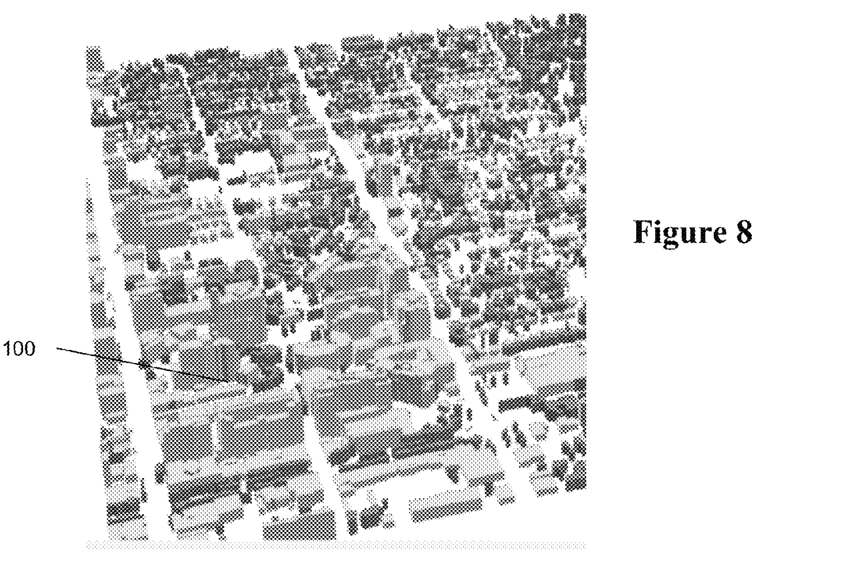
FIG. 8 is a pictorial diagram showing a portion of the three dimensional model shown in FIG. 6.

Consider a specific 2-story multi-unit wood frame building (100), as shown in FIG. 8. The relevant building specifications for the hurricane simulations are provided in Table 2.

TABLE 2

Specification of exemplary structure.

| Construction Type | Frame |
|---|---|
| Number of Stories | 3 |
| Roof Shape | Flat |
| Roof Cover Type | SPM |
| Roof Cover Quality | Good |
| Roof Deck Attachment | 8 d @ 6"/12" |
| Roof-Wall Connection | Strap |
| Secondary Water Resistance | No |
| Shudders | No |

Using LULC to Calculate Roughness Length—

Using the Florida Water Management District LULC database, FEMA's HAZUS 2.0 software assigns a roughness length of 0.41 to the census tract where this building is located. Running a 100,000 year simulation with this roughness length yields an AAL of $1.19 (per $100 of building value.

Using the Methods of the Present Invention to Calculate Roughness Length—

The methodology provided herein is based on the following four steps:

(1) Retrieve LIDAR data for the area surrounding the building of interest;

(2) From the LIDAR data, automatically construct a 3D model of the buildings, trees, and terrain;

(3) For the area closest to the building, run a computational fluid dynamics (CFD) simulation to estimate wind speeds at roof level. From these wind speeds, calculate an equivalent roughness length; and (4) For a wider geographic area, use the 3D model to calculate a roughness length using the widely accepted Lettau's formula. Combine with the local roughness length calculated in (3) to calculate an effective roughness length for the building of interest.

Figure 9:
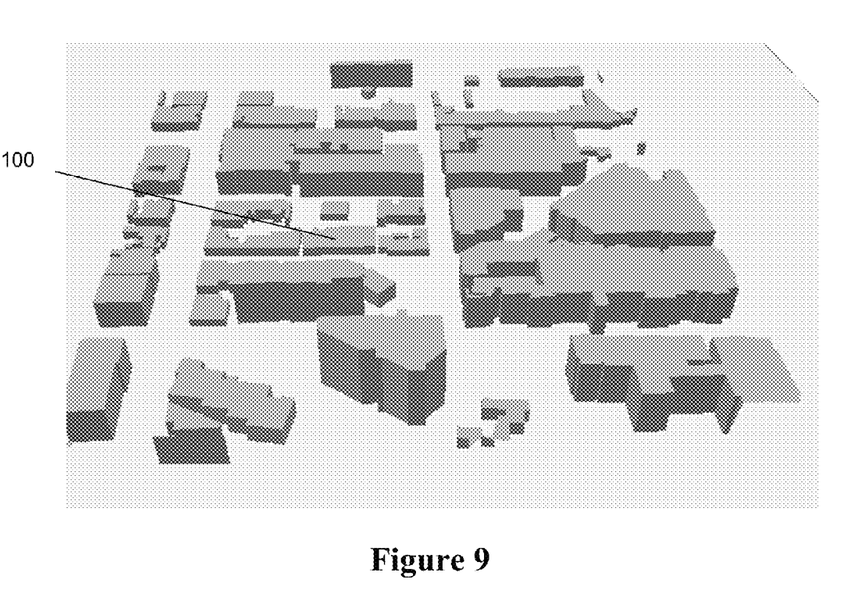
FIG. 9 is a pictorial diagram showing a close up of the lower left corner of the portion of the 3D model shown in FIG. 8.
Figure 10:
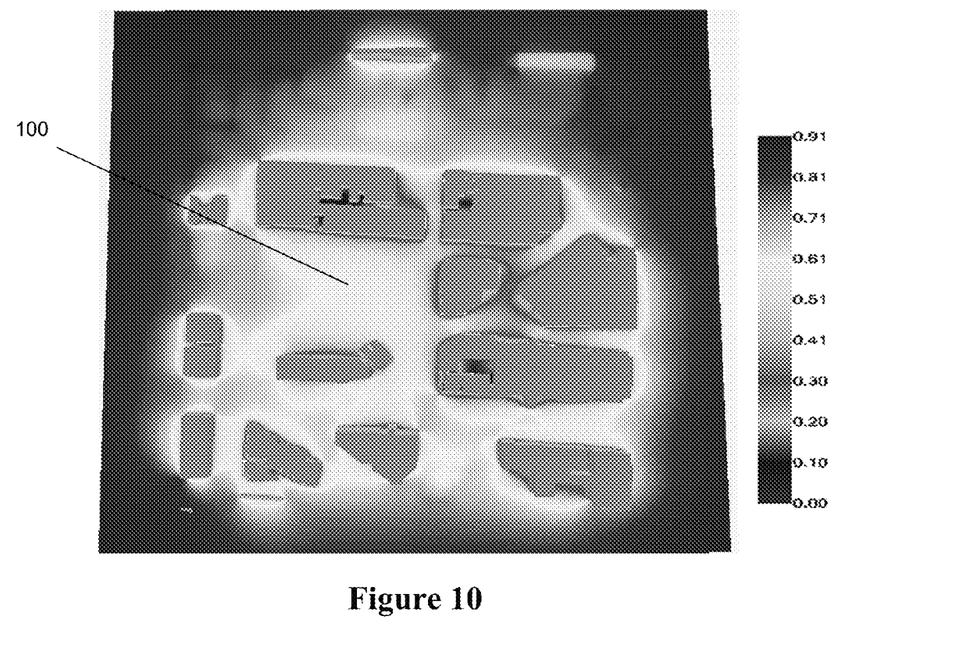
FIG. 10 is a pictorial diagram showing the results of a computational fluid dynamics simulation of wind speeds at different points within the close up view shown in FIG. 9.

The entire 3D model created in steps (1) and (2) is shown FIG. 6. A close up of the portion of the 3D model used for CFD simulations is shown FIG. 9. The composite results of a CFD simulation of 12 different wind directions is shown in FIG. 10. The shading indicates the weighted average peak gust speed over all 12 directions at a height of 20 m as a percentage of the wind speed at a height of 100 m. Given two wind speeds v1 and v2, at two different heights h1 and h2, an effective roughness length $Z_0$ can be calculated by the following form of the Log Wind Profile equation:

$$Z_0 = e^{(v2*ln(h1) - v1*ln(h2))/(v2-v1)} \qquad (II)$$

For the wind speed at the building of interest, the effective roughness length is therefore:

$$Z_0 = e^{(100*ln(20) - 60*ln(100))/(100-60)}$$

$$Z_0 = 1.87$$

This roughness length value, however, is still an underestimate of the real roughness length because the CFD simulations implicitly assume that there is open-terrain (i.e., an extremely low roughness length) upwind of the simulated area. To adjust for this, a roughness length is calculated for a much larger area using a 3D model (similar to the one shown in FIG. 6) using Lettau's formula:

$$Z_0 = 0.5 * H * S/A \qquad (I)$$

where H is the average height of obstacles in an area, S is the total frontal surface area of all obstacles "seen" by the wind (measured in the vertical-crosswind-lateral plane), and A is the total ground area. In practical situations, the H*S term is split into one for buildings, and one for trees, with a porosity of 0.5 usually used for the latter. Also, since S is different for different wind directions, an S value averaged over several wind directions is used. For the four square kilometer area around the building (100) of interest (not including the CFD simulation area), the following parameters were calculated, thereby allowing for the calculation of an estimated roughness length from the 3D model:

| | |
|---|---|
| H(bldg) | 7.6 m |
| H(trees) | 14.3 m |
| S(bldg) | 189,933 m² |
| S(trees) | 296,521 m² |
| A | 4,000,000 m² |
| $Z_0$ | 0.46 |

With an estimated roughness length in a larger area around the building, the roughness length calculated in the CFD simulation can then be adjusted. In the original CFD roughness length calculation, the wind speed at a height of 100 m was assumed to be 100% of the open-terrain wind speed. Using $Z_0 = 0.71$ and the following formula:

$$v1 = v2 * \frac{\ln\frac{h_1}{z_0}}{\ln\frac{h_2}{z_0}} \qquad (III)$$

it can be seen that the wind speed at 100 m over the area in the CFD simulation is 88% of the open-terrain wind speed. Likewise, the speed at 20 m is 42% of the open-terrain wind speed. These corrections yield the following overall effective roughness length for the building of interest:

$$Z_0 = e^{(88*ln(20) - 402*ln(100))/(88-42)}$$

$$Z_0 = 4.6$$

Running a 100,000 year probabilistic simulation with this roughness length yields an AAL of $0.47. Recall that the AAL calculated using the less precise LULC roughness length method was $1.19, which is over 200% higher.

It is interesting to note that simply moving the building (100) of interest 200 meters north, where it would be much less shielded from other buildings, yields an AAL of $1.27, which is higher than the LULC AAL estimate. This highly local variation in wind patterns in urban and suburban environments is very common, and is the underlying basis which allows the methodology of the present invention to accurately estimate the AAL of a structure.

Although the invention has been described with reference to the above example, it will be understood that modifications and variations are encompassed within the spirit and scope of the invention. Accordingly, the invention is limited only by the following claims.

What is claimed is:

1. A system for estimating roughness length of an area surrounding a structure comprising:
   a data storage device having imaging data of the structure and its surrounding area and program instructions; and
   a processor coupled to the data storage device, the processor being operable to execute the program instructions to construct a 3D model of the structure and its surrounding area using the imaging data, and calculate a roughness length of the area surrounding the structure using the 3D model.

2. The system of claim 1, the data storage device further comprises program instructions to perform a CFD simulation of wind flow through the 3D model to determine local wind speed, and using the Log Wind Profile equation to calculate roughness length from the determined local wind speed.

3. The system of claim 1, wherein the roughness length is calculated with Lettau's formula.

4. The system of claim 1, wherein the data storage device further comprises tree data, wherein the tree data includes the number and sizes of trees in the surrounding area, and additional program instructions to configure a wind-storm simulation using the calculated tree density and tree height, and calculate AAL, PML, or insurance premium for the structure using the 3D model to determine tree density and tree height of trees in the surrounding area.

5. The system of claim 1, wherein the imaging data is selected from the group consisting of light detection and ranging (LIDAR) data, aerial photography data, satellite photography data, and any combination thereof.

6. The system of claim 1, wherein the data storage device further comprises program instructions for estimating a plurality of additional roughness lengths of additional areas surrounding the structure, and wherein the processor calculates the roughness length using a weighted average of the additional roughness lengths.

7. The system of claim 1, wherein the processor is also operable to calculate the insurability of the structure based on the calculated roughness length.

8. The system of claim 7, wherein the insurability of the structure is calculated by comparing the calculated roughness length to a second roughness length of the area surrounding the structure calculated from Land Use Land Cover data.

9. The system of claim 8, wherein if a difference between the second roughness length and the calculated roughness length falls within a threshold value chosen from the interval (−1 to 10), the structure is deemed insurable.

10. The system of claim 4, wherein the AAL, PML, or insurance premium of the structure is determined by modifying an existing AAL, PML, or insurance premium using the calculated roughness length.

11. The system of claim 10, wherein the existing AAL, PML, or insurance premium is modified by a function of the calculated roughness length.

12. The system of claim 2, wherein the step of performing a CFD simulation includes simulating wind coming from a plurality of directions relative to the structure and calculating a weighted average relative wind speed at the structure.

* * * * *